United States Patent
Wynkoop et al.

(10) Patent No.: US 10,024,423 B1
(45) Date of Patent: Jul. 17, 2018

(54) BRAKING REDUCTION USING TRANSMISSION CONTROL

(71) Applicant: Caterpillar Inc., Peoria, IL (US)

(72) Inventors: Christopher Lewis Wynkoop, Eureka, IL (US); Matthew James Sirovatka, Aurora, IL (US); Sairam Gopalan Velamakanni, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/486,064

(22) Filed: Apr. 12, 2017

(51) Int. Cl.
| | |
|---|---|
| *F16H 59/44* | (2006.01) |
| *F16H 61/14* | (2006.01) |
| *F16H 59/70* | (2006.01) |
| *F16H 59/54* | (2006.01) |
| *F16H 59/40* | (2006.01) |

(52) U.S. Cl.
CPC .......... *F16H 61/143* (2013.01); *F16H 59/40* (2013.01); *F16H 59/44* (2013.01); *F16H 59/54* (2013.01); *F16H 59/70* (2013.01); *F16H 2061/147* (2013.01)

(58) Field of Classification Search
CPC .. F16H 61/143; F16H 2061/147; F16H 59/40; F16H 59/44; F16H 59/70
See application file for complete search history.

(56) References Cited

U.S. PATENT DOCUMENTS

| | | | |
|---|---|---|---|
| 4,095,486 A | 6/1978 | Ohnuma | |
| 4,108,022 A | 8/1978 | Arai et al. | |
| 4,961,484 A | 10/1990 | Kato et al. | |
| 5,720,690 A * | 2/1998 | Hara | B60K 6/48 180/65.25 |
| 6,102,831 A | 8/2000 | Wakahara et al. | |
| 6,269,295 B1 | 7/2001 | Gaugush et al. | |
| 6,719,076 B1 | 4/2004 | Tabata et al. | |
| 7,393,299 B2 | 7/2008 | Inoue et al. | |
| 2008/0177451 A1* | 7/2008 | Saitou | F16H 61/0213 701/55 |
| 2011/0239804 A1* | 10/2011 | Hase | B60K 6/48 74/473.11 |
| 2015/0266481 A1* | 9/2015 | Nedorezov | B60W 10/026 192/3.33 |

FOREIGN PATENT DOCUMENTS

EP      1627763 B1      12/2007

* cited by examiner

*Primary Examiner* — Huan Le
(74) *Attorney, Agent, or Firm* — Miller, Matthias & Hull

(57) ABSTRACT

A braking reduction and transmission control system is implemented in a vehicle or machine having a power source and an automatic transmission connected by a torque converter providing a fluid coupling between a power source output shaft and a transmission input shaft. A lock-up clutch operatively connect to the torque converter is locked when the shafts are rotating at approximately the same speed. The braking reduction and transmission control system unlocks the lock-up clutch when operating conditions of the machine indicate that a transmission downshift will occur, such as when a combination of a brake input device displacement and a machine ground speed compared to a transmission downshift schedule indicate that the downshift will occur. Prior to downshifting the transmission and unlocking the torque converter, the drivetrain assists the service brakes in slowing the machine.

20 Claims, 4 Drawing Sheets

BRAKING REDUCTION USING TRANSMISSION CONTROL

TECHNICAL FIELD

The present disclosure relates generally to braking in vehicles and machines and, more particularly, a torque converter and a controllable lock-up clutch integrated into a braking strategy for a vehicle or machine to reduce the use and overheating of the brakes of the vehicle or machine.

BACKGROUND

Work machines such as wheel loaders and the like include drivetrain to drive traction devices such as wheels, tracks and the like to propel the work machine over a work surface. In one typical drivetrain arrangement, a power source, such as an internal combustion engine, is operatively connected to an automatic transmission by a torque converter. The transmission is in turn operatively connected to an axle that turns the traction devices to propel the machine over a work surface. The automatic transmission is connected to the power source by a torque converter that replaces the manual clutch of a manual transmission. The torque converter is a fluid coupling that allows the power source to operate at low speeds, such as when the power source is idling, without being fluidly coupled to the transmission. At higher power source speeds that create greater fluid pressure within the torque converter, the pressurized fluid drives the transmission and transfers the rotating power from the power source to the rotating driven load presented by the transmission to drive the transmission and the traction devices to propel the machine. The torque converter may include a lock-up clutch that can be locked so a power source output shaft and a transmission input shaft rotate at the same speed, and unlocked to allow the shafts to rotate at different speeds. An example of a torque converter and lock-up clutch arrangement is provided in U.S. Pat. No. 4,961,484, issued to Kato et al. on Oct. 9, 1990, entitled "Brake Device for a Vehicle."

Present machines further include brake force devices applying brake forces to the machine on components such as axle on which the traction devices are mounted. The brake force devices apply brake force to the components in response to an operator of the machine displacing a brake input device within an operator station of the machine. The brake force reduces the ground speed of the machine over the work surface, eventually to the point where the transmission will downshift to a lower gear. In these arrangements, the lock-up clutch is unlocked if necessary shortly after displacement of the brake input device is detected, and the drivetrain provides minimal retarding force on the machine during braking due to slippage in the torque converter. As a result, the brake force device provides the majority of the retarding of the machine so that the brake force devices and the engaged components of the machine experience the wear and tear and heat generation associated with braking the machine.

SUMMARY OF THE DISCLOSURE

In one aspect of the present disclosure, a machine. The machine includes a power source having a power source output shaft, a transmission having a transmission input shaft and a transmission output shaft, a torque converter operatively connected to the power source output shaft and the transmission input shaft, and a lock-up clutch (LUC) operatively connected to the torque converter. The LUC has a LUC unlocked position where the power source output shaft and the transmission input shaft are free to rotate relative to each other and a LUC locked position where the power source output shaft and the transmission input shaft are locked for rotation together. The machine further includes a brake input device, a brake force device applying a brake force in response to displacement of the brake input device to reduce a machine ground speed of the machine, a brake input device position sensor operatively connected to the brake input device to detect displacement of the brake input device and transmit brake input device displacement signals having displacement values corresponding to a sensed amount of displacement of the brake input device, a transmission output speed sensor operatively connected to the transmission output shaft to detect a current transmission output speed and transmit transmission output speed signals having speed values corresponding to the current transmission output speed, and an electronic control module (ECM) operatively connected to the LUC, the brake input device position sensor and the transmission output speed sensor. The ECM is programmed to detect a brake input device displacement of the brake input device based on the displacement values in the brake input device displacement signals from the brake input device position sensor, to determine a current machine ground speed of the machine based on the speed values in the transmission output speed signals from the transmission output speed sensor, to compare a combination of the brake input device displacement and the current machine ground speed to a transmission downshift schedule for the transmission stored in a memory associated with the ECM, to determine whether the combination of the brake input device displacement and the current machine ground speed will cause the transmission to downshift based on the comparison of the combination of the brake input device displacement and the current machine ground speed to the transmission downshift schedule, and to transmit LUC control signals to the LUC to cause the LUC to move to the LUC unlocked position when the combination of the brake input device displacement and the current machine ground speed will cause the transmission to downshift.

In another aspect of the present disclosure, a method for controlling engagement of a lock-up clutch (LUC) of a torque converter to assist with braking to slow a machine is disclosed. The torque converter is operatively connected to a power source output shaft of a power source and a transmission input shaft of a transmission, and the LUC is operatively connected to the impeller and the turbine and has a LUC unlocked position where the power source output shaft and the transmission input shaft are free to rotate relative to each other and a LUC locked position where the power source output shaft and the transmission input shaft are locked for rotation together. The method includes detecting a brake input device displacement of a brake input device, determining a current machine ground speed of the machine, comparing a combination of the current machine ground speed and the brake input device displacement to a transmission downshift schedule for the transmission, determining whether the combination of the brake input device displacement and the current machine ground speed will cause the transmission to downshift based on the comparison of the combination to the transmission downshift schedule, and causing the LUC to move to the LUC unlocked position when the combination of the brake input device displacement and the current machine ground speed will cause the transmission to downshift.

In a further aspect of the present disclosure, a brake system for a machine is disclosed. The machine has a power source having a power source output shaft, a transmission having a transmission input shaft, a torque converter operatively connected to the power source output shaft and the transmission input shaft, and a lock-up clutch (LUC) operatively connected to the power source output shaft and the transmission input shaft and having a LUC unlocked position where the power source output shaft and the transmission input shaft are free to rotate relative to each other and a LUC locked position where the power source output shaft and the transmission input shaft are locked for rotation together. The brake system includes a brake input device, a brake force device applying a brake force in response to displacement of the brake input device to reduce a machine ground speed of the machine, a brake input device position sensor operatively connected to the brake input device to detect displacement of the brake input device and transmit brake input device displacement signals having displacement values corresponding to a sensed amount of displacement of the brake input device, a speed sensor operatively connected to a component of the machine to detect a speed of the component that is indicative of a current machine ground speed and transmit machine ground speed signals having speed values corresponding to the current machine ground speed, and an electronic control module (ECM) operatively connected to the LUC, the brake input device position sensor and the speed sensor. The ECM is programmed to detect a brake input device displacement of the brake input device based on the displacement values in the brake input device displacement signals from the brake input device position sensor, to determine the current machine ground speed of the machine based on the speed values in the machine ground speed signals from the speed sensor, to compare a combination of the brake input device displacement and the current machine ground speed to a transmission downshift schedule for the transmission stored in a memory associated with the ECM, to determine whether the combination of the brake input device displacement and the current machine ground speed will cause the transmission to downshift based on the comparison of the combination of the brake input device displacement and the current machine ground speed to the transmission downshift schedule, and to transmit LUC control signals to the LUC to cause the LUC to move to the LUC unlocked position when the combination of the brake input device displacement and the current machine ground speed will cause the transmission to downshift.

Additional aspects are defined by the claims of this patent.

DETAILED DESCRIPTION

Figure 1:
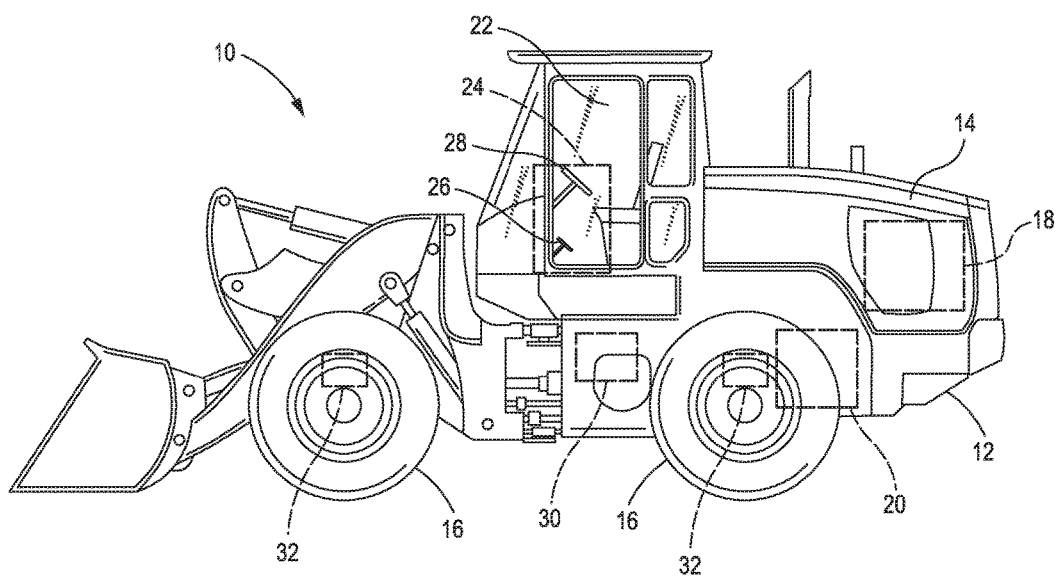
FIG. 1 is a side view of an exemplary vehicle or machine that can travel over a work surface.

FIG. 1 shows an exemplary vehicle or machine 10 in the form of a wheel loader that may traverse a work surface at a work site. While a wheel loader is shown, the braking reduction and transmission control strategy discussed herein may be implemented in any other appropriate type of work vehicle or machine that can be propelled over a work surface. The machine 10 includes a frame 12 supporting a machine body 14, and with the frame 12 being supported above the work surface by traction devices 16. As illustrated, the traction devices 16 include a plurality of wheels, but the traction devices 16 could be any other appropriate devices such as an undercarriage with tracks, halftracks, or combinations of tracks, wheels or other traction devices.

The machine 10 is driven by a drivetrain including a power source 18, such as an engine, operatively connected to a transmission 20 that in turn is operatively connected to the wheels 16. The transmission 20 transfers power generated by the engine 18 to the wheels 16 to rotate the wheels 16 and propel the machine 10 over the work surface. The transmission 20 may be any automatic transmission having a series of gears and clutches (not shown), with the clutches selectively engaging the gears to achieve a plurality of forward and reverse drive gears having corresponding gear ratios to provide a range of speed and torque outputs necessary for the machine 10 to travel over the work surface and perform work functions.

An operator can control the movement of the machine 10 along with other operations of the machine 10 at an operator station 22. The controlled operations can include speed control, braking, steering, load dumping, actuation of implements of the machine 10, and the like. The operator station 22 may have a plurality of operator input devices 24 for inputting commands for the engine 18, the transmission 20 and other systems of the machine 10. The operator input devices 24 can include engine throttles, brake pedals 26, gear shift levers, steering wheels 28, implement lift and articulation controls, graphical user interfaces, and the like. Sensors associated with each of the operator input devices 24 detect manipulation of the operator input devices 24 by an operator and transmit corresponding input device sensor signals that are received and processed by an electronic control module (ECM) 30. Particularly relevant to the present disclosure are brake input device sensor signals transmitted from a brake input device displacement sensor when a brake input device such as the brake pedal 26 is displaced to cause a braking force to be applied to reduce the ground speed of the machine 10. The brake input device sensor signals may be evaluated by the ECM 30 to determine when braking assistance can and should be applied by the drivetrain according to the braking reduction and transmission control strategy discussed in greater detail below.

The machine 10 also collects and records operational data relating to the operation of the machine 10 as it operates within the work site and traverses the work surface. The machine 10 may include a variety of sensors 32 operating independently or as components of other control and monitoring systems to automatically monitor various operational data during travel of the machine 10 over the work surface and the performance of machine operations within the work site. The sensors 32 monitoring the operational data may include speed sensors detecting machine, engine and transmission speeds, and torque sensors sensing torque at various points along the drivetrain and/or rolling resistance of the wheels 16. Some operational data may be monitored directly, while other data may be derived or calculated from the monitored parameters.

Figure 2:
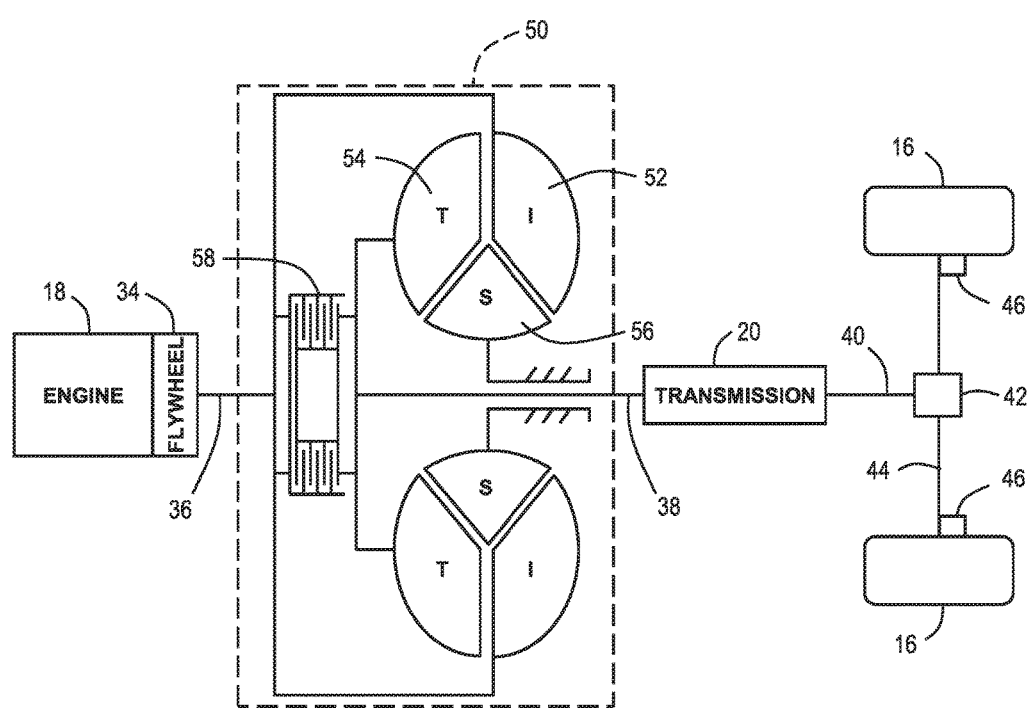
FIG. 2 is a schematic illustration of a drivetrain of the vehicle or machine of FIG. 1 that includes a torque converter.

FIG. 2 shows a schematic illustration of the drivetrain of the machine 10 from the engine 18 to the wheels 16. The engine 18 may include a rotational energy storage device such as a flywheel 34, and have a power source output shaft 36 extending therefrom. The transmission 20 includes a transmission input shaft 38 at an input end and a transmission output shaft 40 at an output end. The forward and reverse drive gears of the transmission 20 have corresponding gear ratios for transmitting the input speed and torque at the transmission input shaft 38 as a desired output speed and torque at the transmission output shaft 40. The transmission output shaft 40 may in turn be operatively connected to a differential 42 that transfers the transmission output torque to an axle 44 that is operatively connected to and propels the wheels 16. One or more brake force devices 46 are operatively connected to the axle 44, the wheels 16 or other moving components of the drivetrain. The brake force devices 46 are selectively actuatable in response to displacement of the brake input device 26 by the operator to apply a brake force to slow the wheels 16 and correspondingly the machine ground speed of the machine 10. In some implementations, the brake force devices 46 are operatively connected to the brake input device 26 by a mechanical linkage or a cable so that displacement of the brake input device 26 is converted into a corresponding movement of the brake force devices 46. In a hydraulic brake system, the brake input device 26 is operatively connected to a brake cylinder so that displacement of the brake input device 26 increases pressure in the brake cylinder to move a piston and in turn engage the brake force devices 46. The brake force devices 46 may be controlled alternatively or as a supplement by the ECM 30, such as in an anti-lock brake system.

As shown in FIG. 2, the machine 10 includes a torque converter 50 that allows the engine 18 to operate at low engine speeds, such as when the engine 18 is idling, without being fluidly coupled to the transmission 20. At higher engine speeds creating greater fluid pressure within the torque converter 50, the torque converter 50 serves as a fluid coupling to the transmission 20 that transfers the rotating power from the engine 18 to the rotating driven load presented by the transmission 20 to drive the transmission 20 and the wheels 16 to propel the machine 10.

The torque converter 50 as illustrated includes an impeller 52, a turbine 54 and a stator 56. The impeller 52 may rotate as shown in the schematic of FIG. 2 in conjunction with and at the same speed as the power source output shaft 36 operatively connected thereto. The turbine 54 is operatively connected to the transmission input shaft 38 so that the transmission input shaft 38 may rotate in conjunction with and at the same speed as the turbine 54. The rotation of the impeller 52 may generate a hydrodynamic fluid coupling within the torque converter 50 and accordingly rotate the turbine 54 and the transmission input shaft 38. The stator 56 may be interposed between the impeller 52 and the turbine 54, and may positively and efficiently alter the fluid flow between the impeller 52 and the turbine 54 when necessary during operation of the machine 10. The stator 56 as illustrated is fixed in position relative to the impeller 52 and the turbine 54, but in alternative embodiments may be fixed in one direction and rotatable in the opposite direction, or be provided with a stator clutch that can be selectively engaged to alternately fix the stator 56 in place or release the stator 56 to freely rotate.

The torque converter further includes a lock-up clutch 58 that is operatively connected between the impeller 52 and the turbine 54. The lock-up clutch 58 is actuatable to selectively engage and lock the impeller 52 and the turbine 54 for rotation together. The lock-up clutch 58 may be in a lock-up clutch (LUC) unlocked position at times such as during acceleration of the vehicle where differential rotation between the impeller 52 and the turbine 54 is desirable. Conversely, the lock-up clutch 58 may be in a LUC locked position to physically link the impeller 52 and the turbine 54 when they are rotating close to the same speed, such as when the vehicle is cruising at a constant speed, and thereby effectively changing the torque converter 50 into a purely mechanical coupling with no slippage and increased efficiency over hydraulic losses presented by the hydrodynamic coupling.

Figure 3:
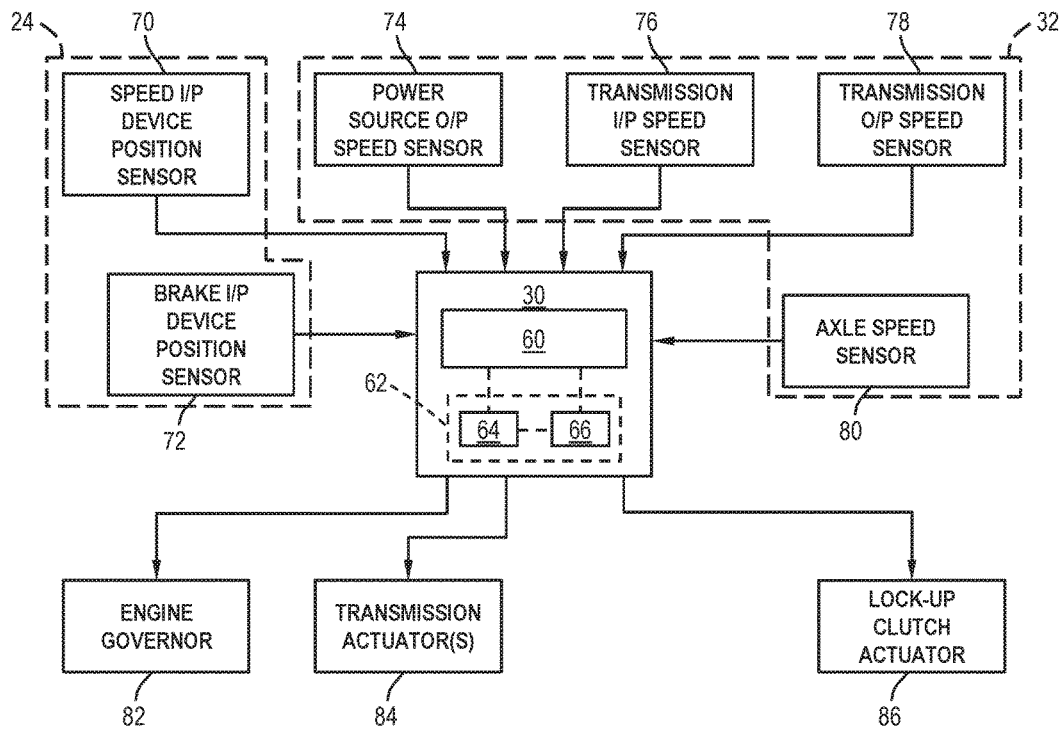
FIG. 3 is a schematic view of electrical and control components of the vehicle or machine of FIG. 1.

The operator input devices 24, the ECM 30 and the sensors 32 are components of a machine control system for the machine 10. Referring to FIG. 3, an exemplary arrangement of electrical and control components of the drivetrain of the machine 10 is shown with various control components integrated into the brake system. The ECM 30 may be capable of processing the information received from the operator input devices 24 and the sensors 32 using software stored at the ECM 30, and outputting command and control signals to the engine 18 and actuators of the machine 10. The ECM 30 may include a processor 60 for executing a specified program, which controls and monitors various functions associated with the machine 10. The processor 60 may be operatively connected to a memory 62 that may have a read only memory (ROM) 64 for storing programs, and a random access memory (RAM) 66 serving as a working memory area for use in executing a program stored in the ROM 64. The memory 62 as illustrated is integrated into the ECM 30, but those skilled in the art will understand that the memory 62 may be separate from the ECM 30 but onboard the machine 10, and/or remote from the ECM 30 and the machine 10, while still being associated with and accessible by the ECM 30 to store information in and retrieve information from the memory 62 as necessary during the operation of the machine 10. Although the processor 60 is shown, it is also possible and contemplated to use other electronic components such as a microcontroller, an application specific integrated circuit (ASIC) chip, or any other integrated circuit device. While the discussion provided herein relates to the functionality of a drivetrain control system, the ECM 30 may be configured to control other aspects of the operation of the machine 10 such as, for example, steering, dumping loads of material, actuating implements and the like. Moreover, the ECM 30 may refer collectively to multiple control and processing devices across which the functionality of the drivetrain control system and other systems of the machine 10 may be distributed. For example, the operator station 22, the engine 18 and a brake system may each have one or more ECMs that communicate with the main ECM 30. Such variations in consolidating and distributing the processing of the ECM 30 as described herein are contemplated as having use in braking reduction and transmission control in accordance with the present disclosure.

The operator input devices 24 have corresponding sensor devices that sense input actions by the operator and are operatively connected to the ECM 30 to transmit sensor signals having values corresponding to the input of the operator. The sensor devices transmit sensor signals to the ECM 30 in response to the operator manipulating the operator input devices 24 in the operator station 22. Relevant to the present disclosure, the sensor devices sense displacement of controls such as a gas pedal or the brake pedal 26 and transmit sensor signals having values corresponding to the amount of displacement of the operator input device 24. The sensor signals may be used by the ECM 30 to control the corresponding components or systems of the machine 10, such as the engine 18 or the brake system, or to perform further processing related to the operation and control of other components and systems that may be dependent on the operator inputs, such as control of the transmission 20 and the lock-up clutch 58 as discussed further below.

The sensors for the operator input devices 24 may include a speed input device position sensor 70 operatively connected to a speed input device, such as a gas pedal, a joystick or other type of speed control device, that is manipulated by the operator to indicate a desire to increase or decrease the ground speed and/or the power of the machine 10. The speed input device position sensor 70 detects an amount of displacement of the speed input device and transmits speed input device displacement signals to the ECM 30 with values corresponding to the displacement of the speed input device. The sensors for the operator input devices 24 may further include a brake input device position sensor 72 operatively connected to a brake input device such as the brake pedal 26 or other input device manipulated by the operator to cause a brake force to be applied to reduce the ground speed of the machine 10. Similar to the speed input device position sensor 70, the brake input device position sensor 72 detects an amount of displacement of the brake input device and transmits brake input device displacement signals to the ECM 30 with values corresponding to the displacement of the brake input device.

The sensors 32 may include sensors providing information about the current operational state of the drivetrain of the machine 10. In general, such sensors 32 may include speed, torque and position sensors transmitting signals corresponding to the rotational speeds, loads on and angular positions of various rotating components of the machine 10. Of particular relevance to the present braking reduction and transmission control strategy are component speed sensors. Consequently, the ECM 30 may be operatively connected to a power source output speed sensor 74, a transmission input speed sensor 76, a transmission output speed sensor 78 and an axle speed sensor 80, among other speed sensing devices. The power source output speed sensor 74 is operatively connected to the power source output shaft 36 and transmits power source output speed signals with values indicating the rotational speed of the power source output shaft 36 and the impeller 52. The transmission input speed sensor 76 is operatively connected to the transmission input shaft 38 and transmits transmission input speed signals with values indicating the rotational speed of the transmission input shaft 38 and the turbine 54. The transmission output speed sensor 78 is operatively connected to the transmission output shaft 40 and transmits transmission output speed signals with values indicating the rotational speed of the transmission output shaft 40. The axle speed sensor 80 is operatively connected to the axle 44 and transmits axle speed signals with values indicating the rotational speed of the axle 44 and the wheels 16.

The ECM 30 is also operatively connected to various output and control device that may be the operational and controllable elements of the machine 10 for propulsion and braking, among other machine functions, that are controlled based on the information from the operator input devices 24 and the sensors 32. The output and control devices include an engine governor 82. The engine governor 82 may be integrated into the engine 18 and may be a mechanical governor, an electronic governor implemented in software, or other appropriate conventional engine output control mechanism and control strategy. As illustrated, the engine governor 82 may receive power source control signals from the ECM 30 to cause the engine governor 82 increase, decrease or maintain the engine output speed and/or power as dictated by the speed input device displacement signals from the speed input device position sensor 70. In alternative embodiments, the engine governor 82 may have a separate ECM and receive the speed input device displacement signals directly from the speed input device position sensor 70 and process the signals to control the engine 18. In other embodiments, a mechanical engine governor 82 may be operatively connected to the speed input device via a linkage, cable or other connection mechanism to response directly to the manipulation of the speed input device by the operator.

The transmission 20 includes a transmission actuator or actuators 84 that operate to engage and disengaged the clutches of the transmission 20 to shift between the available gears and corresponding gear ratios as the engine output speed of the engine 18 and the ground speed of the machine 10 increase and decrease in response to the operators manipulation of the speed input device. A transmission upshift schedule may be stored in the memory 62 and accessed by the ECM 30 to determine when to upshift from one gear to the next higher gear at the appropriate time to maximize the performance of the machine 10. The transmission upshift schedule may include portions for each upshift that is performed by the transmission 20 (1-2, 2-3, 3-4, etc.). The ECM 30 may use inputs such as the engine output speed from the power source output speed sensor 74, and the transmission output speed from the transmission output speed sensor 78 or the axle speed from the axle speed sensor 80 from which the machine ground speed can be derived, in conjunction with the transmission upshift schedule to determine when to upshift to the next gear. A transmission downshift schedule may also be stored in the memory 62 and used by the ECM 30 to determine when to downshift from one gear to the next lower gear at the appropriate time. The transmission downshift schedule may also include portions for each downshift, and the ECM 30 may use similar sensed speed to determine when to transmit control signals to the transmission actuators 84 to execute the downshift. The ECM 30 may also use the brake input device displacement from the brake input device position sensor 72 in determining when to cause the transmission actuators 84 to perform the downshift. The transmission downshift schedule is discussed further below in conjunction with the braking reduction and transmission control strategy of the present disclosure.

A lock-up clutch actuator 86, such as an electronic clutch pressure control (ECPC) valve, controls the locking and unlocking of the lock-up clutch 58. An ECPC valve is exemplary only, and the lock-up clutch 58 may be controlled by any appropriate clutch actuator mechanism. The ECM 30 is programmed as part of the braking reduction and transmission control strategy to transmit LUC control signals to the LUC actuator 86 to move the lock-up clutch 58 between the LUC locked and unlocked positions. Consequently, when the machine 10 reaches a cruising speed and the ECM 30 determines that the impeller 52 and the turbine 54 are rotating at approximately the same speed, the ECM 30 may transmit LUC control signals to the LUC actuator 86 to set the lock-up clutch 58 in the LUC locked position for direct drive of the transmission input shaft 38 by the power source output shaft 36. When the operating conditions indicate that high torque loads are or will be experienced or other factors causing the machine 10 to slow down exist, the ECM 30 will transmit LUC control signals to the LUC actuator 86 to unlock the lock-up clutch 58. Such conditions can include factors external or internal to the machine 10, such as when the operator causes displacement of the brake input device 26 to slow the machine 10. The response of the ECM 30 to displacement of the brake input device 26 to cause the LUC actuator 86 to unlock the lock-up clutch 58 as part of the braking reduction and transmission control strategy is discussed further below.

There are a variety of strategies for determining when to perform a downshift for an automatic transmission. One example is provided in U.S. Pat. No. 6,269,295 issued to Gaugush et al. on Jul. 31, 2001, entitled "Method and Apparatus for Transmission Control During Braking." The Gaugush et al. patent teaches aspects of a transmission downshift schedule where the brake pedal position, the machine ground speed, the engine output speed, the current gear and a lowest operating gear are evaluated to determine whether a downshift should be executed. The reference does not discuss, however, determining when a lock-up clutch may be locked or unlocked during operation of a machine or vehicle.

Figure 4:
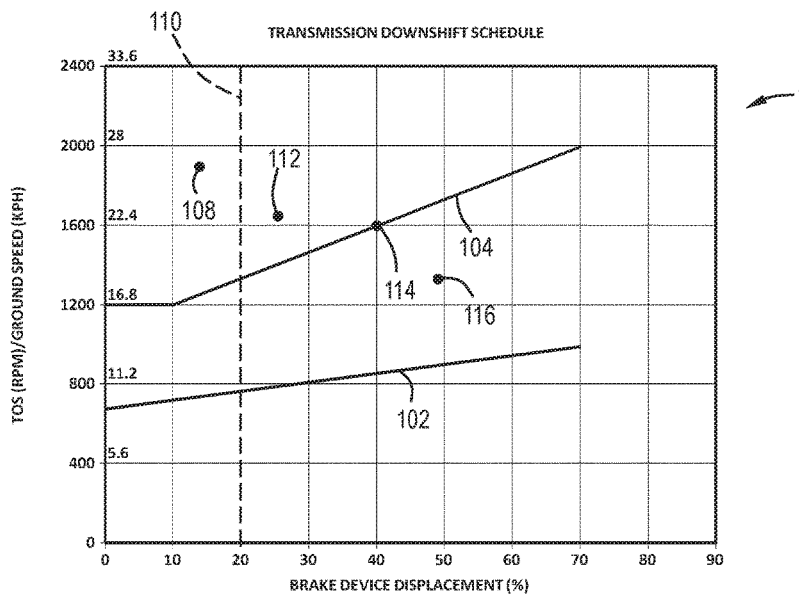
FIG. 4 is a graph of brake input device displacement versus transmission output speed/ground speed with an exemplary transmission downshift schedule of a transmission of the vehicle or machine of FIG. 1.

FIG. 4 presents a graph 100 showing a portion of an exemplary transmission downshift schedule for the machine 10 used in an alternative downshift strategy. The X-axis of the graph 100 represents the brake input device displacement expressed as a percentage of a maximum brake input device displacement. The Y-axis represents the transmission output speed (TOS) in revolutions per minute and/or the machine ground speed in kilometers per hour. A first line 102 on the graph 100 represents a portion of the transmission downshift schedule for downshifting from third gear to second gear, and a second line 104 represents a portion of the transmission downshift schedule for downshifting from fourth gear to third gear. The lines 102, 104 are exemplary only, and the transmission downshift schedule graph 100 may vary based on the operating requirements for a particular machine 10.

In general, for a given gear, a downshift will occur when the combination of a current brake input device displacement and a current machine ground speed crosses the corresponding line 102, 104 from above and to the left of the line 102, 104 to below and to the right of the line 102, 104. Using the fourth gear line 104 as an example, when the brake input device 26 is not displaced, a downshift will be executed when the transmission output speed drops below 1,200 rpm and/or the machine ground speed drops below 16.8 kph (10.44 mph). As the brake input device 26 is displaced, the transmission output speed or the machine ground speed remains the same initially. Consequently a downshift does not occur at a point 108 above and to the left of the line 104. The point 108 is within a dead band of brake actuation below a minimum brake input device displacement line 110 where the brake input device 26 is displaced but the brake force devices 46 are not yet applying a brake force to the axle 44 and/or the wheels 16. A second point 112 is beyond the dead band, but the machine 10 has not slowed to a transmission output speed or a machine ground speed that will trigger a downshift to third gear.

As the brake input device displacement and the brake force increase, the transmission output speed and the machine ground speed decrease until the combination intersects the line 104 at a point such as point 114. At the point 114, the ECM 30 determines that the downshift to third gear should occur, and transmits control signals to the transmission actuator 84 to cause the transmission clutches to shift the transmission 20 to third gear. Depending on the sampling rate of the sensors 74, 76, 78, 80, the rate of deceleration of the machine 10, and the speed at which the operator depresses the brake input device 26, the ECM 30 may not determine that the downshift should occur until a combination such as at a point 116 that is below and to the right of the line 104. At that point, the ECM 30 will transmit transmission control signals to cause the transmission actuators 84 to downshift the transmission 20 to third gear and then begin to evaluate the brake input device displacement and the transmission output speed and machine ground speed against the third gear portion of the transmission downshift schedule represent by the line 102. Those skilled in the art will understand that the downshifting strategies discussed herein are exemplary of strategies with transmission downshift schedules that do not address locking and unlocking of lock-up clutches in torque converters, and into which the braking reduction and transmission control strategy in accordance with the present disclosure may be integrated.

INDUSTRIAL APPLICABILITY

In previously known machines, the brake force devices 46 provide the majority of the braking force to slow the machine 10 when the brake input device 26 is displaced. The torque converter 50 allows relative rotation between the power source output shaft 36 and the transmission input shaft 38, so the drivetrain contributes minimal retarding force to slow the machine 10. Even when the lock-up clutch 58 is locked, current machines 10 are configured to unlock the lock-up clutch 58 after a relatively minimal displacement of the brake input device 26. In some previous implementations, the lock-up clutch 58 is unlocked after a fixed amount of brake input device displacement regardless of the machine ground speed, the engine output speed, the transmission output speed or the current transmission gear. With the lock-up clutch 58 unlocked, using the brake force devices 46 to engage the axle 44 and/or the wheels 16 on their own can lead to overheating and premature failure of the components.

In a braking reduction and transmission control strategy in accordance with the present disclosure, the drivetrain is used to assist in slowing the machine 10 when the operator displaces the brake input device 26 by keeping the lock-up clutch 58 locked until the operating conditions indicate that the transmission 20 is going to downshift. This allows the drivetrain to stay in direct drive longer and provide increased retarding that reduces the wear and heating of the brake force devices 46, the axle 44 and the wheels 16. The braking performance is improved as the service brakes are assisted by the drivetrain and less heat is transferred to the axle 44, thereby prolonging the useful life of the axle 44.

Figure 5:
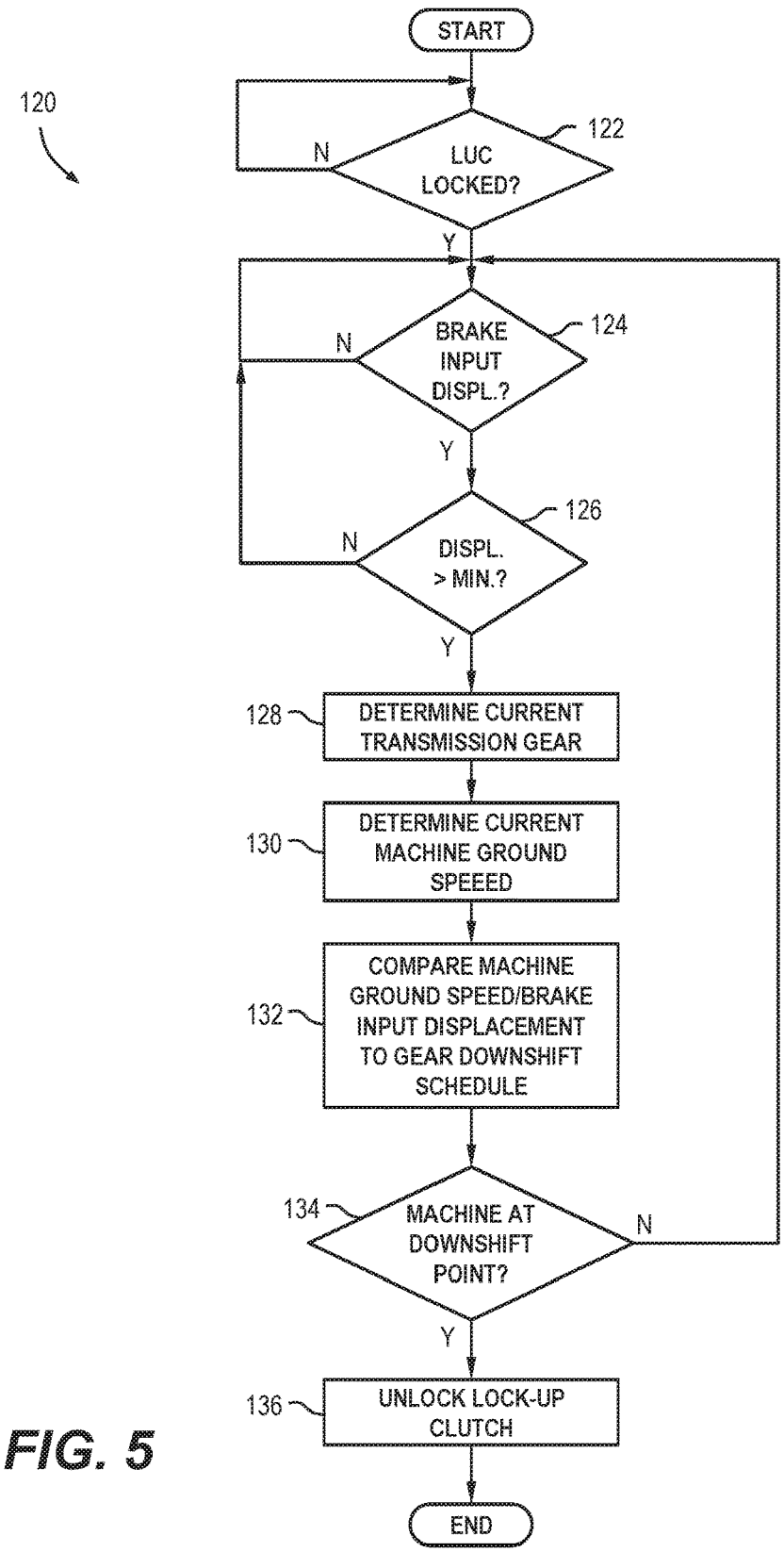
FIG. 5 is a block diagram of a braking reduction and transmission control routine in accordance with the present disclosure that may be executed by an electronic control module of the vehicle or machine of FIG. 1.

FIG. 5 is a flow diagram for a LUC unlocking routine 120 that may be stored in the memory 62 and executed by the ECM 30 to control the unlocking of the lock-up clutch 58 when the operator displaces the brake input device 26 to reduce the machine ground speed of the machine 10. The routine 120 may use the brake input device displacement, the machine ground speed and a transmission downshift schedule such as those described above or similar schedules to determine an optimal time to unlock the lock-up clutch 58 so that the transmission may apply a retarding force for at least a period of time to assist the brake force devices 46 and reduce the friction and heat generated by the braking components. The routine 120 may begin at a block 122 where the ECM 30 determines whether the lock-up clutch 58 is locked. As discussed previously, the ECM 30 may transmit LUC control signals to the LUC actuator 86 to lock the lock-up clutch 58 when the transmission input speed is approximately equal to the power source output speed. The ECM 30 may maintain a LUC status indicating whether the lock-up clutch 58 is locked or unlocked, or may determine the current state of the lock-up clutch 58 during execution of the routine 120. If the ECM 30 determines that the lock-up clutch 58 is unlocked at the block 122, control may return to the start of the routine 120 until the lock-up clutch 58 is locked for direct drive of the transmission 20. Of course, those skilled in the art will understand that the comparison at the block 122 may be omitted, and the ECM 30 may perform the processing described below continuously as the machine 10 is operated.

If the ECM 30 determines that the lock-up clutch 58 is locked at the block 122, or if the block 122 is omitted, control passes to a block 124 where the ECM 30 evaluates the brake input device displacement signals from the brake input device position sensor 72 to determine whether the operator is displacing the brake input device 26. If the brake input device displacement signals indicate no displacement, the operator is not commanding brake force to slow the machine 10. In this case, control may pass back to the block 124 to continue monitoring the brake input device displacement signals for operator input. If the ECM 30 determines that the brake input device 26 is being displaced by the operator at the block 124, control may pass to a block 126 where the ECM 30 may determine whether the brake input device displacement signals indicate that the brake input device 26 is displaced by more than a predetermined minimum brake input device displacement. In some implementations, it may not be necessary or desired to unlock the lock-up clutch 58 when the displacement of the brake input device 26 is only within the dead band area to the left of the line 110 on the graph 100 of FIG. 4 and the brake force devices 46 are not yet applying friction to slow the machine 10. Consequently, the ECM 30 may pass control back to the block 124 when such minimal displacement of the brake input device 26 is created by the operator. Depending on the implementation, the block 124 and the initial displacement detection may be omitted, and the single step of comparing any displacement of the brake input device 26 to the minimum brake input device displacement may be performed.

If the ECM 30 determines that the displacement of the brake input device 26 is greater than the minimum brake input device displacement at the block 126, control may pass to a block 128 where the ECM 30 determines a current transmission gear of the transmission 20. As discussed above in relation to the transmission downshift schedule graph 100 of FIG. 4, each downshift from a higher gear to a lower gear has a different downshift schedule such as those shown by the lines 102, 104, for example. The ECM 30 determines the current transmission gear so the correct portion of the transmission downshift schedule can be used in deciding whether to unlock the lock-up clutch 58. The current transmission gear may be stored in a searchable data structure within the memory 62 when the ECM 30 executes an upshift or a downshift. In implementations where the ECM 30 is a brake ECM 30 dedicated to the brake system of the machine 10 and a separate ECM 30 may control the transmission 20, the ECMs 30 may be configured to transmit the current transmission gear to the brake ECM 30 when a transmission shift occurs, or the current transmission gear may be requested by the brake ECM 30 from the transmission ECM 30 during the execution of the block 128.

After determining the current transmission gear at the block 128, control passes to a block 130 where the ECM 30 determines a current machine ground speed of the machine 10. The ECM 30 may use appropriate sensor signals to derive the current machine ground speed. For example, the ECM 30 may use the transmission output speed from the transmission output speed signals and convert from revolutions per minute to kilometers per hour as shown on the Y-axis of the graph 100. Alternatively, the axle speed from the axle speed signals from the axle speed sensor 80 and a wheel diameter of the wheels 16 may be used to calculate the current machine ground speed.

With the current transmission gear and the current machine ground speed determined at the blocks 128, 130, respectively, and the brake input device displacement known from the brake input device displacement signals, control may pass to a block 132 where the current machine ground speed and the current brake input device displacement are compared to the transmission downshift schedule to determine whether a downshift is going to occur. In the exemplary transmission downshift schedule of FIG. 4 as discussed above, a downshift will occur when the combination of the brake input device displacement and the machine ground speed is on the line 104 for fourth gear, for example, like the point 114, or is below and to the right of the line 104 like the point 116. The transmission downshift schedule corresponding to the particular downshift strategy implemented in the machine 10 may be stored in the memory 62 as a map, an array or other searchable data structure containing brake input device displacements and machine ground speeds corresponding to the lines 102, 104.

The ECM 30 may be programmed to search the map for the current brake input device displacement. If the current brake input device displacement is found in the portion of the transmission downshift schedule for the current transmission gear, a downshift will occur if the current machine ground speed is less than or equal to the machine ground speed corresponding to the brake input device displacement. If the current brake input device displacement is not found on the transmission downshift schedule map, the ECM 30 may use the map entries on either side of the current brake input device displacement and interpolate to derive the machine ground speed at which the transmission downshift should occur, and compare the derived machine ground speed to the current machine ground speed in a similar manner. Of course, the ECM 30 could be programmed to search the transmission downshift schedule map for the current machine ground speed and compare the corresponding brake input device displacement to the current brake input device displacement, and determine that the transmission downshift will occur if the current brake input device displacement is greater than or equal to the brake input device displacement from the transmission downshift schedule map. Other alternative methods for comparison performed at the block 132 may be implemented as necessary based on the downshift strategy and transmission downshift schedule implemented in the machine 10, and such comparisons are contemplated in strategies in accordance with the present disclosure.

After the comparison is performed at the block 132, control passes to a block 134 where the ECM 30 determines whether the machine 10 is at a downshift point. If the comparison indicates that the combination of the current machine ground speed and the current brake input device displacement is above and to the left of the corresponding line 102, 104 of the transmission downshift schedule such as at points 108, 112 in FIG. 4, the downshift is not yet going to occur and the direct drive of the locked lock-up clutch 58 can be maintained to assist in slowing the machine 10. Prior to the transmission downshift, control may pass back to the block 124 to continue monitoring the brake input device displacement. If the combination is on the line 102, 104 (point 114) or below and to the right of the line 102, 104 (point 116), the machine 10 is at a downshift point and control may pass to a block 136 where the ECM 30 will transmit LUC control signals to the LUC actuator 86 to disengage and unlock the lock-up clutch 58 and allow the power source output shaft 36 and the transmission input shaft 38 to rotate at different speeds.

Keeping the lock-up clutch 58 locked as long as possible under the braking reduction and transmission control strategy herein is optimal for providing a retarding force on the machine 10 and thereby reducing the wear and tear on the brake force devices 46 and the heat transfer to the axle 44 and/or the wheels 16. However, if the lock-up clutch 58 is locked when the transmission downshift occurs, the direct drive can result in a harsh shift with high levels of deceleration or jerk, which can be uncomfortable to the operator of the machine 10. The braking reduction and transmission control strategy in accordance with the present disclosure eliminates jerking and operator discomfort by identifying the optimal time to release the lock-up clutch 58 to maximize retarding assistance by the drivetrain while providing a smooth downshift, i.e, at the time the transmission downshift is executed. Unlocking the lock-up clutch 58 generally takes less time as executing a transmission downshift, so the lock-up clutch 58 is consistently and reliably unlocked before the lower gear is engaged.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A machine comprising:
    a power source having a power source output shaft;
    a transmission having a transmission input shaft and a transmission output shaft;
    a torque converter operatively connected to the power source output shaft and the transmission input shaft;
    a lock-up clutch (LUC) operatively connected to the torque converter, the LUC having a LUC unlocked position where the power source output shaft and the transmission input shaft are free to rotate relative to each other and a LUC locked position where the power source output shaft and the transmission input shaft are locked for rotation together;
    a brake input device;
    a brake force device applying a brake force in response to displacement of the brake input device to reduce a machine ground speed of the machine;
    a brake input device position sensor operatively connected to the brake input device to detect displacement of the brake input device and transmit brake input device displacement signals having displacement values corresponding to a sensed amount of displacement of the brake input device;
    a transmission output speed sensor operatively connected to the transmission output shaft to detect a current transmission output speed and transmit transmission output speed signals having speed values corresponding to the current transmission output speed; and
    an electronic control module (ECM) operatively connected to the LUC, the brake input device position sensor and the transmission output speed sensor,
    the ECM being programmed to:
        detect a brake input device displacement of the brake input device based on the displacement values in the brake input device displacement signals from the brake input device position sensor,
        determine a current machine ground speed of the machine based on the speed values in the transmission output speed signals from the transmission output speed sensor,
        compare a combination of the brake input device displacement and the current machine ground speed to a transmission downshift schedule for the transmission,
        determine whether the combination of the brake input device displacement and the current machine ground speed will cause the transmission to downshift based on the comparison of the combination of the brake input device displacement and the current machine ground speed to the transmission downshift schedule, and
        transmit LUC control signals to the LUC to cause the LUC to move to the LUC unlocked position when the combination of the brake input device displacement and the current machine ground speed will cause the transmission to downshift.

2. The machine of claim 1, wherein the ECM is programmed to determine that the transmission will downshift when the combination of the brake input device displacement and the current machine ground speed is on the transmission downshift schedule.

3. The machine of claim 1, wherein the ECM is programmed to determine that the transmission will downshift when the current machine ground speed is on the transmission downshift schedule and the brake input device displacement is greater than a shift schedule brake input device displacement corresponding to the current machine ground speed.

4. The machine of claim 1, wherein the ECM is programmed to determine that the transmission will downshift when the brake input device displacement is on the transmission downshift schedule and the current machine ground speed is less than a shift schedule machine ground speed corresponding to the brake input device displacement.

5. The machine of claim 1, wherein the ECM is programmed to:

compare the brake input device displacement to a minimum brake input device displacement; and determine whether the combination of the brake input device displacement and the current machine ground speed will cause the transmission to downshift when the brake input device displacement is greater than the minimum brake input device displacement.

6. The machine of claim 1, wherein the transmission has a plurality of transmission gear ratios for transmitting torque from the transmission input shaft to the transmission output shaft, and wherein the ECM is programmed to:

determine a current one of the plurality of gear ratios of the transmission;

determine a portion of the transmission downshift schedule that corresponds to the current one of the plurality of gear ratios of the transmission;

compare the combination of the current machine ground speed and the brake input device displacement to the portion of the transmission downshift schedule for the current one of the plurality of gear ratios; and determine whether the combination of the brake input device displacement and the current machine ground speed will cause the transmission to downshift based on the comparison of the combination of the brake input device displacement and the current machine ground speed to the portion of the transmission downshift schedule for the current one of the plurality of gear ratios.

7. A method for controlling engagement of a lock-up clutch (LUC) of a torque converter to assist with braking to slow a machine, where the torque converter is operatively connected to a power source output shaft of a power source and a transmission input shaft of a transmission, and the LUC is operatively connected to the power source output shaft and the transmission input shaft and has a LUC unlocked position where the power source output shaft and the transmission input shaft are free to rotate relative to each other and a LUC locked position where the power source output shaft and the transmission input shaft are locked for rotation together, the method comprising:

detecting a brake input device displacement of a brake input device;

determining a current machine ground speed of the machine;

comparing a combination of the current machine ground speed and the brake input device displacement to a transmission downshift schedule for the transmission;

determining whether the combination of the brake input device displacement and the current machine ground speed will cause the transmission to downshift based on the comparison of the combination to the transmission downshift schedule; and causing the LUC to move to the LUC unlocked position when the combination of the brake input device displacement and the current machine ground speed will cause the transmission to downshift.

8. The method of claim 7, determining that the transmission will downshift when the combination of the brake input device displacement and the current machine ground speed is on the transmission downshift schedule.

9. The method of claim 7, determining that the transmission will downshift when the current machine ground speed is on the transmission downshift schedule and the brake input device displacement is greater than a shift schedule brake input device displacement corresponding to the current machine ground speed.

10. The method of claim 7, determining that the transmission will downshift when the brake input device displacement is on the transmission downshift schedule and the current machine ground speed is less than a shift schedule machine ground speed corresponding to the brake input device displacement.

11. The method of claim 7, where determining the current machine ground speed of the machine comprises:

sensing a transmission output speed of a transmission output shaft of the transmission; and converting the transmission output speed to the current machine ground speed.

12. The method of claim 7, comprising:

comparing the brake input device displacement to a minimum brake input device displacement; and determining whether the combination of the brake input device displacement and the current machine ground speed will cause the transmission to downshift when the brake input device displacement is greater than the minimum brake input device displacement.

13. The method of claim 7, wherein the transmission has a plurality of gear ratios, and wherein comparing the combination of the current machine ground speed and the brake input device displacement to the transmission downshift schedule and determining whether the combination will cause the transmission to downshift comprises:

determining a current one of the plurality of gear ratios of the transmission;

determining a portion of the transmission downshift schedule that corresponds to the current one of the plurality of gear ratios of the transmission;

comparing the combination of the current machine ground speed and the brake input device displacement to the portion of the transmission downshift schedule for the current one of the plurality of gear ratios; and determining whether the combination of the brake input device displacement and the current machine ground speed will cause the transmission to downshift based on the comparison of the combination of the brake input device displacement and the current machine ground speed to the portion of the transmission downshift schedule for the current one of the plurality of gear ratios.

14. A brake system for a machine having a power source having a power source output shaft, a transmission having a transmission input shaft, a torque converter operatively connected to the power source output shaft and the transmission input shaft, and a lock-up clutch (LUC) operatively connected to the power source output shaft and the transmission input shaft and having a LUC unlocked position where the power source output shaft and the transmission input shaft are free to rotate relative to each other and a LUC locked position where the power source output shaft and the transmission input shaft are locked for rotation together, the brake system comprising:

a brake input device;

a brake force device applying a brake force in response to displacement of the brake input device to reduce a machine ground speed of the machine;

a brake input device position sensor operatively connected to the brake input device to detect displacement of the brake input device and transmit brake input device displacement signals having displacement values corresponding to a sensed amount of displacement of the brake input device;

a speed sensor operatively connected to a component of the machine to detect a speed of the component that is indicative of a current machine ground speed and transmit machine ground speed signals having speed values corresponding to the current machine ground speed; and an electronic control module (ECM) operatively connected to the LUC, the brake input device position sensor and the speed sensor, the ECM being programmed to detect a brake input device displacement of the brake input device based on the displacement values in the brake input device displacement signals from the brake input device position sensor, determine the current machine ground speed of the machine based on the speed values in the machine ground speed signals from the speed sensor, compare a combination of the brake input device displacement and the current machine ground speed to a transmission downshift schedule for the transmission, determine whether the combination of the brake input device displacement and the current machine ground speed will cause the transmission to downshift based on the comparison of the combination of the brake input device displacement and the current machine ground speed to the transmission downshift schedule, and transmit LUC control signals to the LUC to cause the LUC to move to the LUC unlocked position when the combination of the brake input device displacement and the current machine ground speed will cause the transmission to downshift.

15. The brake system of claim 14, wherein the ECM is programmed to determine that the transmission will downshift when the combination of the brake input device displacement and the current machine ground speed is on the transmission downshift schedule.

16. The brake system of claim 14, wherein the ECM is programmed to determine that the transmission will downshift when the current machine ground speed is on the transmission downshift schedule and the brake input device displacement is greater than a shift schedule brake input device displacement corresponding to the current machine ground speed.

17. The brake system of claim 14, wherein the ECM is programmed to determine that the transmission will downshift when the brake input device displacement is on the transmission downshift schedule and the current machine ground speed is less than a shift schedule machine ground speed corresponding to the brake input device displacement.

18. The brake system of claim 14, where the speed sensor is a transmission output speed sensor operatively connected to a transmission output shaft of the transmission to detect a current transmission output speed and transmit transmission output speed signals having the speed values corresponding to the current transmission output speed, wherein the ECM is programmed to determine the current machine ground speed based on the speed values in the transmission output speed signals.

19. The brake system of claim 14, wherein the ECM is programmed to:

compare the brake input device displacement to a minimum brake input device displacement; and determine whether the combination of the brake input device displacement and the current machine ground speed will cause the transmission to downshift when the brake input device displacement is greater than the minimum brake input device displacement.

20. The brake system of claim 14, wherein the transmission has a plurality of transmission gear ratios for transmitting torque from the transmission input shaft to a transmission output shaft of the transmission, and wherein the ECM is programmed to:

determine a current one of the plurality of gear ratios of the transmission;

determine a portion of the transmission downshift schedule that corresponds to the current one of the plurality of gear ratios of the transmission;

compare the combination of the current machine ground speed and the brake input device displacement to the portion of the transmission downshift schedule for the current one of the plurality of gear ratios; and determine whether the combination of the brake input device displacement and the current machine ground speed will cause the transmission to downshift based on the comparison of the combination of the brake input device displacement and the current machine ground speed to the portion of the transmission downshift schedule for the current one of the plurality of gear ratios.

* * * * *